US007227868B2

(12) United States Patent
Inden

(10) Patent No.: US 7,227,868 B2
(45) Date of Patent: Jun. 5, 2007

(54) RELAY CONNECTION MANAGEMENT PROGRAM, RELAY CONNECTION MANAGEMENT METHOD, RELAY CONNECTION MANAGEMENT APPARATUS AND RECORDING MEDIUM WHICH STORES RELAY CONNECTION MANAGEMENT PROGRAM

(75) Inventor: Takashi Inden, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1151 days.

(21) Appl. No.: 10/103,362

(22) Filed: Mar. 21, 2002

(65) Prior Publication Data

US 2003/0108031 A1 Jun. 12, 2003

(30) Foreign Application Priority Data

Dec. 10, 2001 (JP) ............................. 2001-375430

(51) Int. Cl.
*H04L 12/56* (2006.01)
(52) U.S. Cl. .................... 370/395.52; 714/748
(58) Field of Classification Search ................ 370/218, 370/386, 387, 389, 394, 395.52, 400, 469, 370/471; 714/749, 748, 750
See application file for complete search history.

(56) References Cited

U.S. PATENT DOCUMENTS

| 6,694,471 B1 * | 2/2004 | Sharp ......................... 714/749 |
| 6,934,257 B2 * | 8/2005 | Liu et al. .................... 370/236 |
| 6,958,997 B1 * | 10/2005 | Bolton ........................ 370/392 |
| 6,961,327 B2 * | 11/2005 | Niu ............................ 370/338 |

FOREIGN PATENT DOCUMENTS

| JP | 2001-036586 | 2/2001 |
| JP | 2001-156795 | 6/2001 |

* cited by examiner

*Primary Examiner*—Brenda Pham
(74) *Attorney, Agent, or Firm*—Greer, Burns & Crain, Ltd

(57) ABSTRACT

A relay system stores destination information of both end systems for which communications are relayed, the sequence number of the one of the end systems is connected with a high quality transmission path, an ACK response number, a re-transmission count, etc. in a connection management table. Upon receiving a re-transmitted packet from the one of end systems, the relay system searches for the connection management table containing a matching sequence number, and increments the re-transmission count in the table by 1. If the re-transmission count has not reached a certain number, the relay system relays the re-transmitted packet as it is to the other end system.

16 Claims, 11 Drawing Sheets

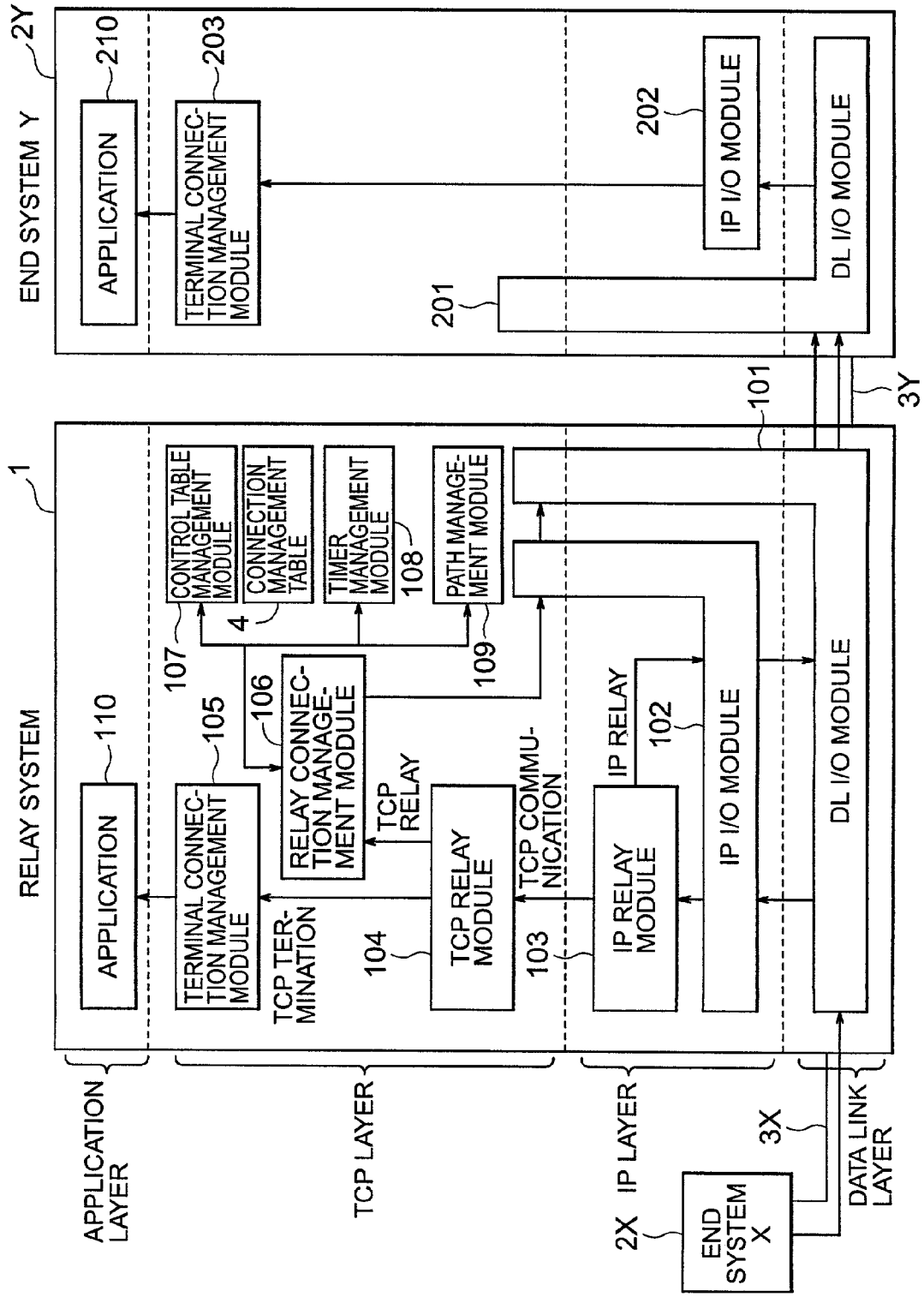

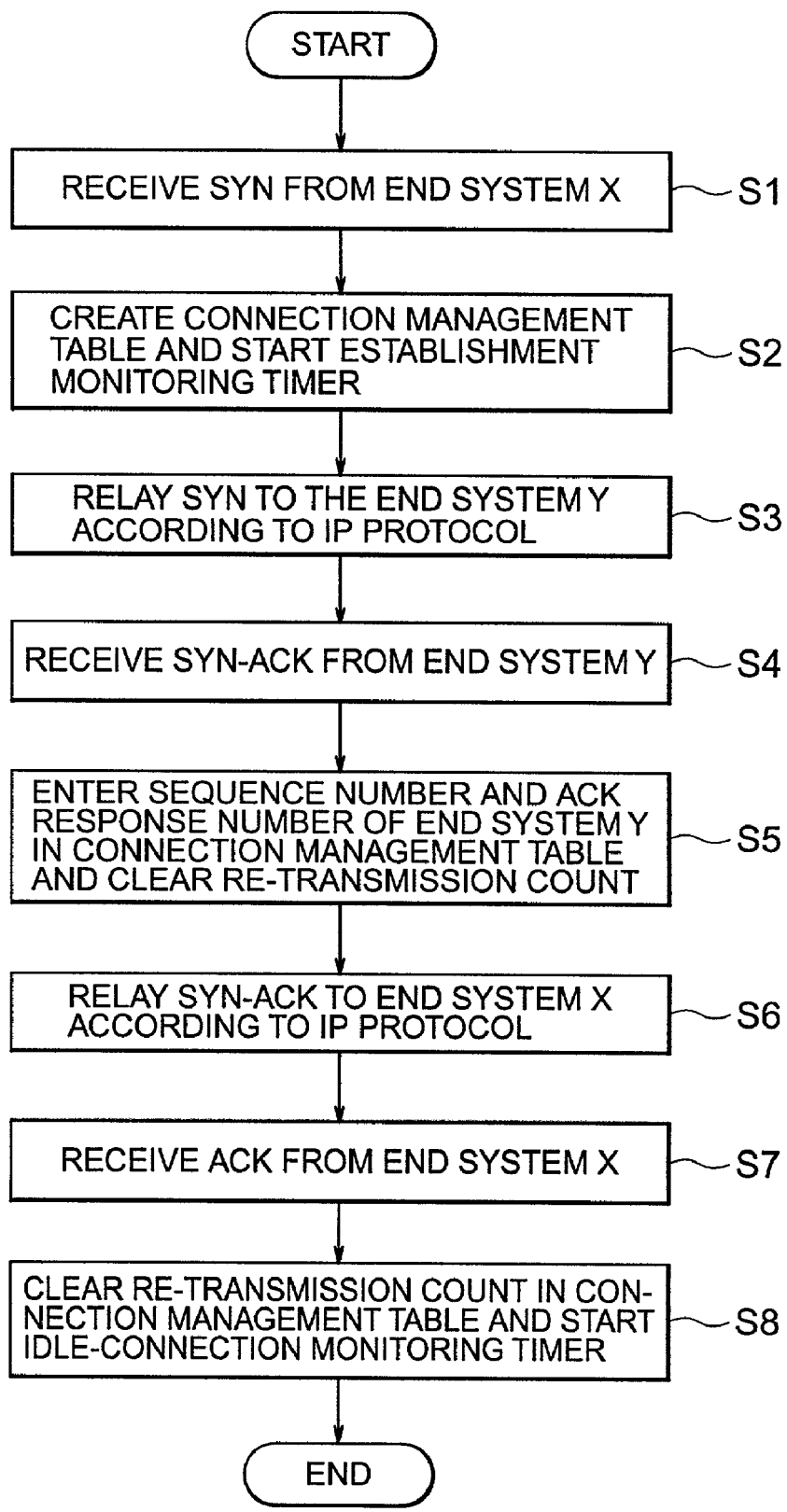

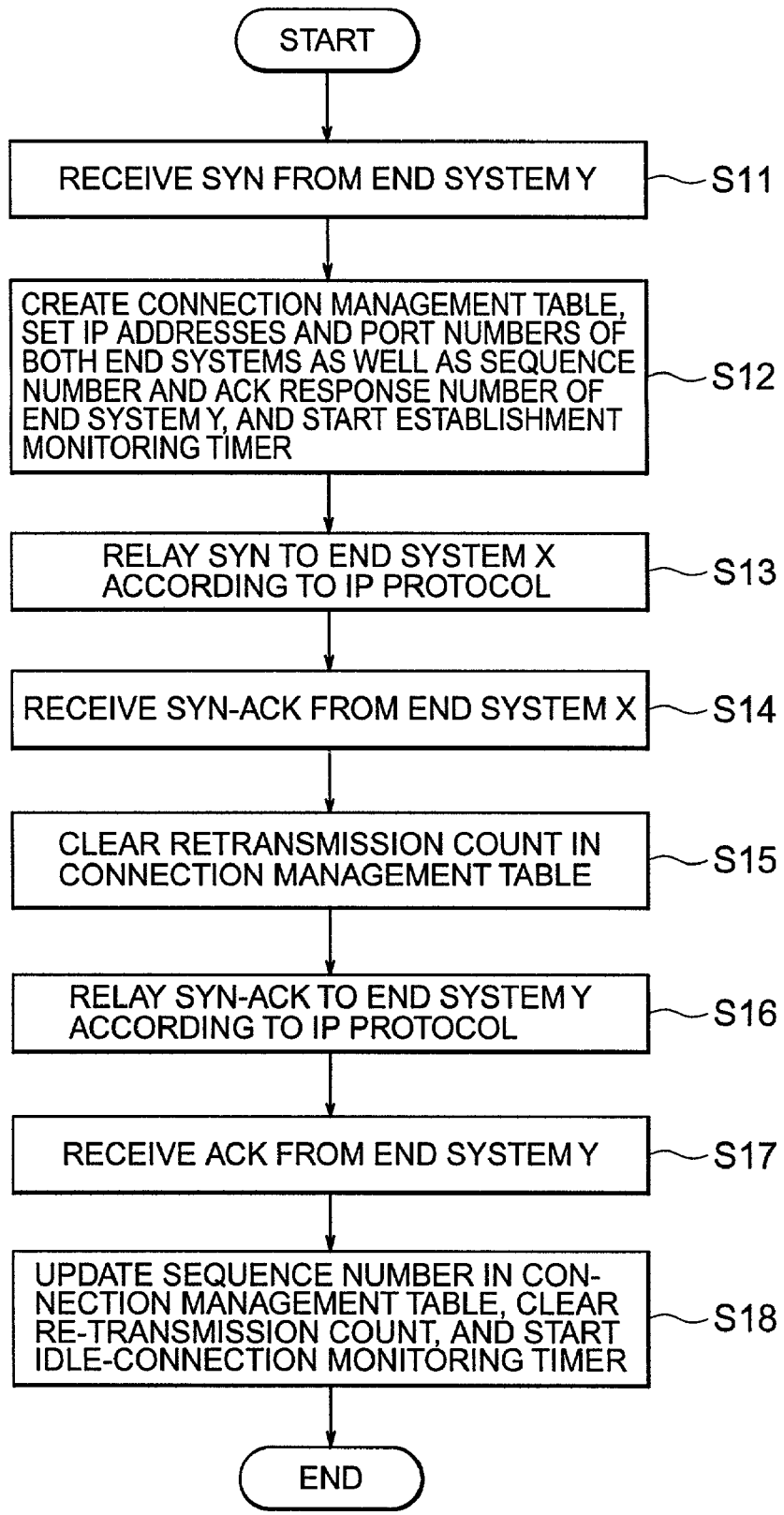

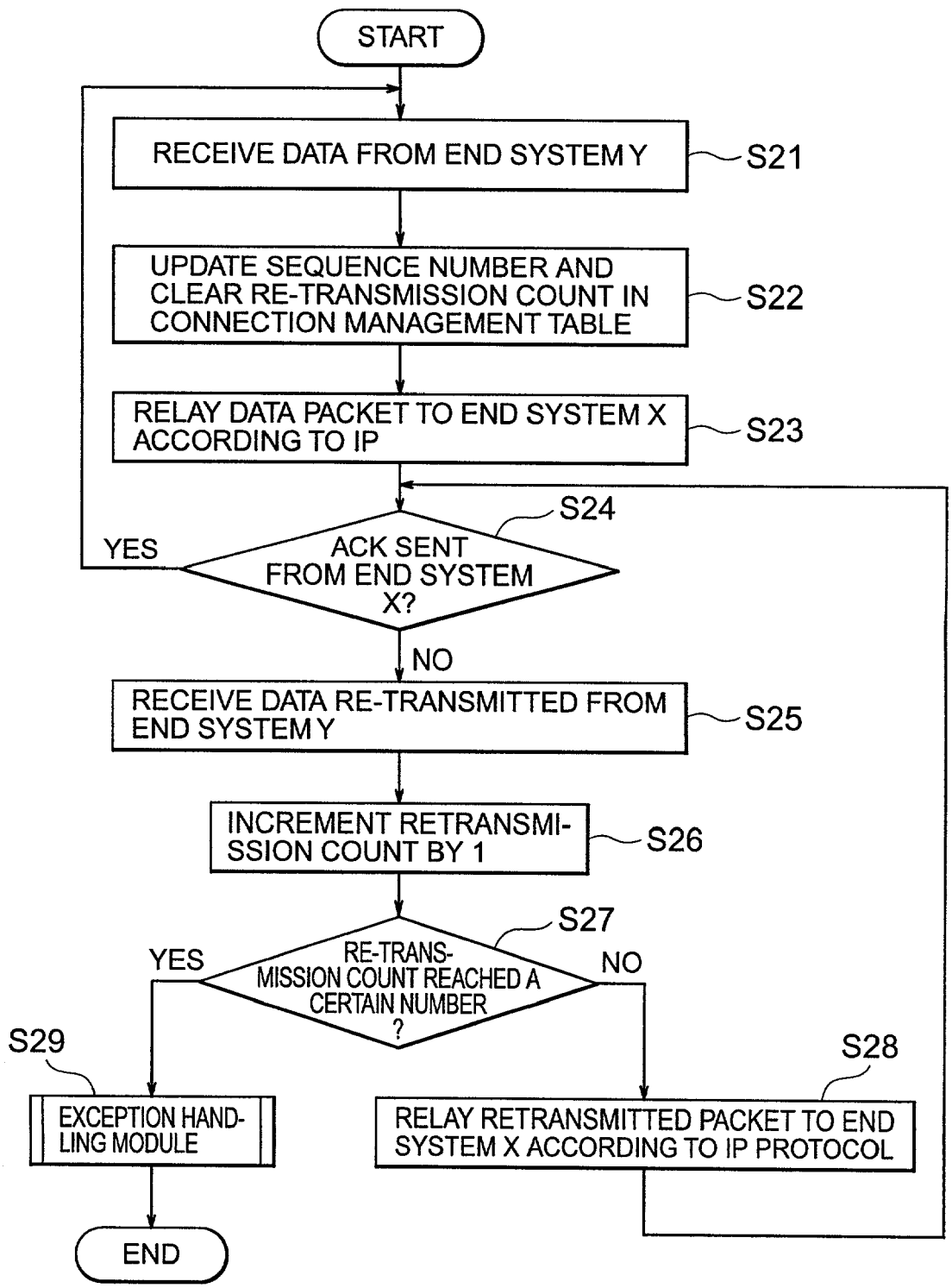

RELAY CONNECTION MANAGEMENT PROGRAM, RELAY CONNECTION MANAGEMENT METHOD, RELAY CONNECTION MANAGEMENT APPARATUS AND RECORDING MEDIUM WHICH STORES RELAY CONNECTION MANAGEMENT PROGRAM

CROSS-REFERENCE TO RELATED APPLICATIONS

This application claims priority from Japanese patent application Serial no. 2001-375430 filed Dec. 10, 2001, the contents of which are incorporated by reference herein.

BACKGROUND OF THE INVENTION

1. Field of the Invention

The present invention relates to a relay connection management program and relay connection management method. More particularly, the present invention relates to a relay connection management program and relay connection management method which can easily implement TCP/IP relay connection management without burdening a relay system which employs a high quality transmission path such as an internal bus connection, for example.

2. Description of the Related Art

FIG. 11A shows an example of a relay system. As shown in FIG. 11A, when implementing a relay system which relays communications with end systems 92X and 29Y according to TCP (Transmission Control Protocol), a relay system 91 terminates with the end system (end node) 92X at a TCP connection a as well as with the end system (end node) 92Y at a TCP connection b.

Such a relay connection normally has protocol stacks such as those shown in FIG. 11B. The relay system 91 is equipped with a sort of symmetrical protocol stack of both end systems for relaying connections. Therefore, the relay system 91 must retain connection information for each of the end systems 92X and 92Y at both ends and associate them with each other, as shown in connection management information tables 94 in FIG. 11C.

For each of the TCP connections between the end systems 92X and 92Y, the relay system 91 must enter and manage connection management information in the connection management information tables 94X and 94Y, including the remote IP address, the local IP address, the remote port number, the local port number, a sequence number, an ACK response number, re-transmission count, timer information, and information about a pointer to the corresponding connection management table.

On the other hand, to implement relay connection management easily in the relay system 91, there is no way but to relay connections at the Internet Protocol Layer (IP Layer) located one layer down, as shown by a broken line in FIG. 11B.

When relaying communications connections between the end systems 92X and 92Y, if a relay system is implemented at the IP layer for the simplicity of processes, the communications quality assurance functions provided by TCP cannot be utilized. Thus, there is demand to alleviate the processing burden on relay systems by simplifying the management processes of TCP equipped with communications quality assurance functions.

Also, in the case of TCP connection relay, the relay system 91 must manage twice as much connection management information as managed by each of the end systems 92X and 92Y. In high-capacity communications, immense memory capacity is required to store connection management information. Thus, it is important to reduce memory usage and thereby cut down costs.

In an asymmetrical relay network configuration in which a transmission path 93Y on one side has extremely high quality, it is deemed unnecessary to manage the TCP connection on the high quality transmission path on an equal basis to the connection on the transmission path 93X of ordinary quality.

SUMMARY OF THE INVENTION

The object of the present invention is to simplify the management processes for TCP connections on the higher quality transmission path and thereby reduce processing burden or memory usage on a relay system in order to implement high-speed transfer while ensuring adequate communications quality in an asymmetrical relay network configuration in which a transmission path on one side has extremely high quality.

The present invention is a program for causing a computer to perform relay connections for relaying communications between one end node and another end node according to a protocol which allows receipt acknowledgement at the transport layer, wherein said program causes said computer to execute a process of accessing connection management information which include destination information of said one end node and said other end node, sequence information and response information for transmission from said one end node to said other end node, and re-transmission count information and updating said connection management information by incrementing said re-transmission count by 1 in case that a re-transmission is received from said one end node and then the sequence number of said re-transmission matches management information in said connection management information; and a process of relaying the re-transmissions received from said one end node to said other end node until said re-transmission count in said connection management information reaches a preset number.

Also, the present invention is a method for relaying communications between one end node and another end node according to a protocol which allows receipt acknowledgement at the transport layer, said method comprising a step of accessing connection management information which include destination information of said one end node and said other end node, sequence information and response information for transmission from said one end node to said other end node, and re-transmission count information and updating said connection management information by incrementing said re-transmission count by 1 in case that a re-transmission is received from said one end node and then the sequence number of said re-transmission matches management information in said connection management information; and a step of relaying the re-transmissions received from said one end node to said other end node until said re-transmission count in said connection management information reaches a preset number.

Also, the present invention is an apparatus for relaying communications between one end node and another end node according to a protocol which allows receipt acknowledgement at the transport layer, said apparatus comprising a means for accessing connection management information which include destination information of said one end node and said other end node, sequence information and response information for transmission from said one end node to said other end node, and re-transmission count information and updating said connection management information by incrementing said re-transmission count by 1 in case that a re-transmission is received from said one end node and then the sequence number of said re-transmission matches management information in said connection management information; and a means for relaying the re-transmissions received from said one end node to said other end node until said re-transmission count in said connection management information reaches a preset number.

Also, the present invention is a recording medium which stores a relay connection management program for causing a computer to perform relay connections for relaying communications between one end node and another end node according to a protocol which allows receipt acknowledgement at the transport layer, wherein said program causes said computer to execute a process of accessing connection management information which include destination information of said one end node and said other end node, sequence information and response information for transmission from said one end node to said other end node, and re-transmission count information and updating said connection management information by incrementing said re-transmission count by 1 in case that a re-transmission is received from said one end node and then the sequence number of said re-transmission matches management information in said connection management information; and a process of relaying the re-transmissions received from said one end node to said other end node until said re-transmission count in said connection management information reaches a preset number.

BRIEF DESCRIPTION OF THE DRAWINGS

FIG. 2 is a diagram showing an example of the system configuration according to an embodiment of the present invention.

FIG. 3 is a diagram showing a flow of processes performed by a relay system in response to a connection request from an end system X.

FIG. 4 is a diagram showing a flow of processes performed by the relay system in response to a connection request from an end system Y.

FIG. 5 is a diagram showing a flow of processes performed by the relay system in case of a fault in a transmission path on the side of the end system X.

DETAILED DESCRIPTION OF THE PREFERRED EMBODIMENTS

Figure 1A:
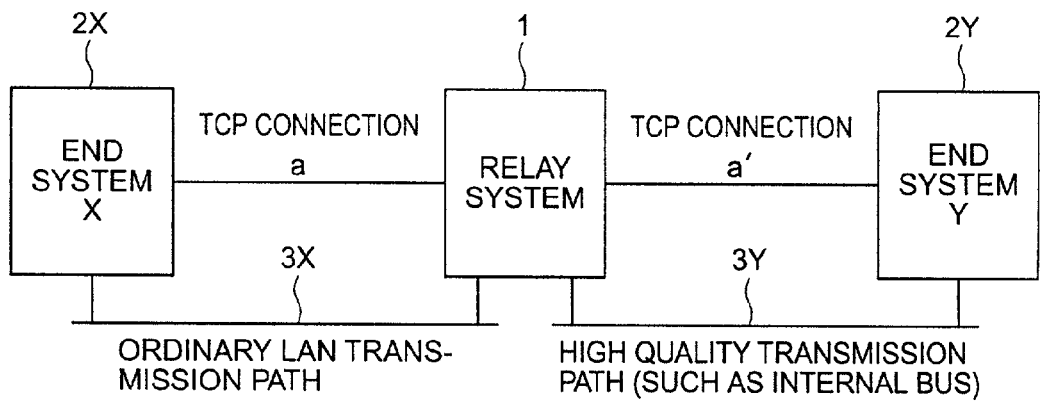
FIG. 1A is a diagram for showing an example of a relay system where the present invention is implemented.

FIG. 1A shows an example of a relay system where the present invention is implemented. As shown in FIG. 1A, a relay system 1 according to the present invention implements connection relay between an end system (end node) 2X and an end system 2Y (end node) by means of relay connection management according to TCP (Transmission Control Protocol).

A transmission path 3X between the relay system 1 and end system 2X is of ordinary quality and consists, for example, of a LAN. On the other hand, a transmission path 3Y between the relay system 1 and end system 2Y is of high, that is such quality that guarantees lossless transmission. It can be, for example, a dedicated channel such as an internal bus, fiber-optic channel, or electric channel. Incidentally, the term "high quality transmission path" as used herein may mean a transmission path which involves transmission loss negligible for communications processing as well as a transmission path without any transmission loss.

Figure 1B:
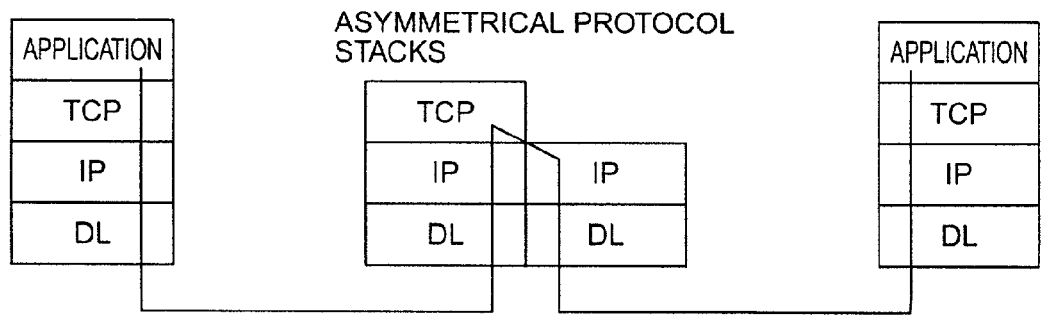
FIG. 1B is a diagram showing protocol stacks example of the connection relay according to the present invention.

FIG. 1B shows a protocol stack example of the connection relay according to the present invention. For a TCP connection a with the end system 2X, the relay system 1 according to the present invention uses TCP-layer connection management, as is usually the case. For a TCP connection a' with the end system 2Y, the relay system 1 uses the TCP connection management functions for the high quality transmission path with some simplification.

Figure 1C:
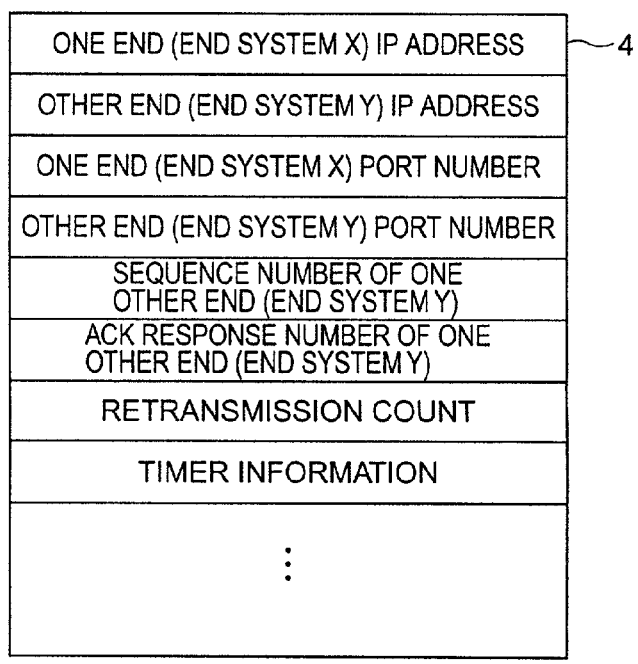
FIG. 1C is a diagram showing an example of connection management information table equipped at the relay system shown in FIG. 1A.

Specifically, the relay system 1 stores a connection management table 4 such as the one shown in FIG. 1C and uses it for connection relay management.

The connection management table 4 stores information for use in the management of the TCP connection a between the end system 2X and relay system 1 as well as the TCP connection a' between the end system 2Y and relay system 1. The information stored in the connection management table 4 includes one end system's (end system 2X) IP address, the other end system's (end system 2Y) IP address, one end system's (end system 2X) port number, the other end system's (end system 2Y) port number, the sequence number of the other end system (end system 2Y) connected by the high quality transmission path 3Y, an ACK response number, the re-transmission count, and timer information.

The connection between the relay system 1 and end system 2Y according to the high quality transmission path 3Y assumes that there is no re-transmission from the end system 2X. Therefore, the relay system 1 does not need to store any information that would otherwise be required in order for the end system 2Y to receive re-transmitted packets (the sequence number or ACK response number of the end system 2X)

Thus, in the relay network configuration which employs the relay system 1 according to the present invention, the connection management information for the two end systems 2 between which a connection is relayed forms a sort of asymmetrical protocol stack (see FIG. 1B), reducing the amount of memory needed to store the connection management information and simplifying connection management processes.

FIG. 2 shows an example of the system configuration according to an embodiment of the present invention.

The relay system 1 manages relay connections for communications between the end system 2X and end system 2Y at the TCP layer (Transport Layer in the TCP/IP model). The relay system 1 comprises a DL (Data Link Layer) input/output module 101, IP (Internet Protocol) input/output module 102, IP relay module 103, TCP relay module 104, terminal connection management module 105, relay connection management module 106, control table management module 107, timer management module 108, and path management module 109.

The processes which distinguish the present invention from conventional TCP-layer-based relay systems are performed by the IP relay module 103, TCP relay module 104, relay connection management module 106, control table management module 107, and timer management module 108 of the relay system 1.

Incidentally, the relay system 1 may comprise an application 110 of the relay system 1, as is the case with conventional relay systems.

The IP relay module 103 provides means for relaying (IP relay) the packets received according to the DL input/output module 101 and IP input/output module 102, as they are, or for sending out (TCP communications) the packets with an IP header removed to the TCP relay module 104 for processing at the TCP layer.

The TCP relay module 104 provides means for relaying (TCP relay) the packets received from the IP relay module 103 according to the relay connection management module 106. If the relay system 1 has an application 110, the TCP relay module 104 sends out the received packets to the terminal connection management module 105 for a TCP termination process The terminal connection management module 105 provides means for sending out the received packets to the application 110 after removing a TCP header from them.

The relay connection management module 106 provides means for managing relay connections based on the connection management table 4 managed by the control table management module 107.

The control table management module 107 provides means for generating a connection management table 4 such as the one shown in FIG. 1C and updating its content based on notification from the relay connection management module 106. Also, it provides means for deleting a connection management table 4 based on notification from the timer management module 108.

The timer management module 108 provides means for timer management including monitoring for a connection request and idle connection. Also, when the control table management module 107 maintains the connection management table 4 for a released connection, the timer management module 108 carries out timer management to retain that connection management table 4. The timer management module 108 notifies the control table management module 107 of a timeout on the retention of the connection management table 4 based, for example, on the maximum time of the monitoring for an idle connection.

The path management module 109 provides means for selecting and switching a communications path if there are two or more selectable paths between the relay system 1 and end system 2X. Incidentally, the path management module 109 needs to be provided only if there are two or more selectable paths between the relay system 1 and an end system 2.

The arrows connecting the modules in FIG. 2 indicate the flow of packets relayed from the end system 2X to the end system 2Y. When packets are sent from the end system 2Y to the end system 2X, they flow in the opposite direction.

Now description will be given about the processes carried out by the relay system 1 to relay a connection request from an end system 2. FIG. 3 shows a flow of processes performed by the relay system 1 in response to a connection request from the end system 2X which connects to the relay system 1 according to an ordinary transmission path 3X.

The relay system 1 receives a connection request from the end system 2X (Step S1). Specifically, the IP relay module 103 passes the connection request (SYN packet) received according to the DL input/output module 101 and IP input/output module 102 to the TCP relay module 104 after removing the IP protocol. The TCP relay module 104 passes the received connection request to the relay connection management module 106 and notifies the control table management module 107 and timer management module 108 to that effect.

The control table management module 107 of the relay system 1 creates a connection management table 4 based on the received connection request and enters the IP addresses and port numbers of both end systems (end system 2X and end system 2Y) between which communication will be established. The timer management module 108 starts an establishment monitoring timer for a designated time (Step S2).

The relay system 1 transmits the received connection request (SYN packet) as it is to the end system 2Y according to IP protocol (Step S3).

The relay system 1 receives a connection acceptance (SYN/ACK packet) from the end system 2Y and the relay connection management module 106 notifies the control table management module 107 and timer management module 108 to that effect (Step S4).

The control table management module 107 of the relay system 1 carries out a search using, as search keys, the IP addresses and port numbers of the end systems (end system 2X and end system 2Y) between which a connection is relayed, enters the sequence number and ACK response number in the appropriate connection management table 4, and resets the re-transmission count to zero (Step S5).

The relay system 1 relays the received connection acceptance (SYN/ACK packet) as it is to the end system 2X according to IP protocol (Step S6). Then, the relay system 1 receives an acknowledgment (ACK packet) from the end system 2X and the relay connection management module 106 notifies the control table management module 107 and timer management module 108 to that effect (Step S7).

The control table management module 107 of the relay system 1 resets the re-transmission count in the appropriate connection management table 4 to zero. Also, timer management module 108 starts an idle-connection monitoring timer for a designated time (Step S8).

The above processes establish connection between the end system 2X and end system 2Y.

FIG. 4 shows a flow of processes performed by the relay system 1 in response to a connection request from the end system 2Y which connects to the relay system 1 according to a high quality transmission path 3Y.

The relay system 1 receives a connection request (SYN packet) from the end system 2Y (Step S11) as is the case with Step S1 in FIG. 3.

The control table management module 107 of the relay system 1 creates a connection management table 4, enters the IP addresses and port numbers of both end systems (end system 2X and end system 2Y) between which communication will be established as well as the sequence number and ACK response number of the end system 2Y, and resets the re-transmission count to zero. The timer management module 108 starts an establishment monitoring timer for a designated time (Step S12).

The relay system 1 relays the received connection request (SYN packet) as it is to the end system 2X according to IP protocol (Step S13). Then, the relay system 1 receives a connection acceptance (SYN/ACK packet) from the end system 2X (Step S14).

The control table management module 107 of the relay system 1 carries out a search using, as search keys, the IP addresses and port numbers of the end systems (end system 2X and end system 2Y) between which communication will be established, and resets the re-transmission count in the appropriate connection management table 4 to zero (Step S15)

The relay system 1 relays the received connection acceptance (SYN/ACK packet) as it is to the end system 2Y according to IP protocol (Step S16). Then, the relay system 1 receives an acknowledgment (ACK packet) from the end system 2Y (Step S17).

The control table management module 107 of the relay system 1 searches for the appropriate connection management table 4, and then updates the sequence number and resets the re-transmission count to zero in the table. The timer management module 108 starts the idle-connection monitoring timer for a designated time (Step S18).

After the connection establishment processes shown in either FIG. 3 or 4, communications are carried out between the end system 2X and end system 2Y.

FIG. 5 shows a flow of processes performed by the relay system 1 in case of a fault in the transmission path between the end system 2X and end system 2Y. The relay system 1 receives data (DT/ACK packet) from the end system 2Y (Step S21) as is the case with Step S1 in FIG. 3.

The control table management module 107 of the relay system 1 searches for the appropriate connection management table 4, and then updates the sequence number and clears the re-transmission count in the connection management table 4 (Step S22).

The IP relay module 103 of the relay system relays the received data (DT/ACK packet) as it is to the end system 2X according to IP protocol (Step S23).

The relay system 1 waits for an ACK response from the end system 2X. If there is no response from the end system 2X due to a fault in the transmission path (Step S24), the relay system 1 receives data (DT/ACK packet) re-transmitted from the end system 2Y (Step S25).

The control table management module 107 searches for the connection management table 4 containing a matching sequence number, and increments the re-transmission count in the table by 1 (Step S26).

The relay connection management module 106 checks whether the re-transmission count has reached a certain number (Step S27). If it has not, the data (DT/ACK packet) re-transmitted to the end system 2X is relayed as it is according to IP protocol (Step S28). If it has reached the certain number, designated exception handling module is performed (Step S29). By exception handling module, for example, the relay system 1 selects a path other than the one currently in use out of the paths managed by the path management module 109 and relays the re-transmitted data (DT/ACK packet) as it is according to IP protocol.

The relay system 1 carries out a normal connection-release process and the control table management module 107 retains the connection management table 4 for a designated time even after the connection is released. Then, when the control table management module 107 is notified of a timeout by the timer management module 108, it deletes the connection management table 4 of the released connection. Incidentally, the timer management module 108 gives the notification to the control table management module 107 based on the idle-connection monitoring timer (e.g., up to 2 hours) but a table retention monitoring timer may be started separately.

If the relay connection management module 106 receives a connection request for a connection between the end system 2X and end system 2Y while the control table management module 107 retains the connection management tables 4 of released connections, the control table management module 107 searches the retained connection management tables 4 for any connection management table 4 that contains the IP addresses and port numbers of the end systems (end system 2X and end system 2Y) between which communication will be established. If such a connection management table 4 is found, the control table management module 107 reuses it for management of the requested connection after clearing the sequence number, ACK response number, re-transmission count, and timer information in that connection management table 4.

Figure 6:
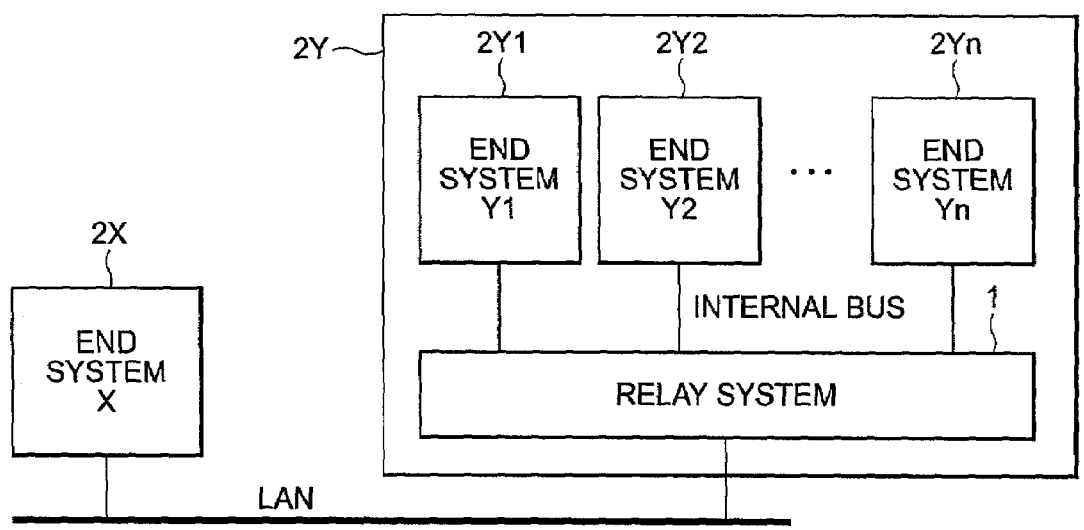
FIG. 6 is a diagram showing an application example of the present invention.

FIG. 6 shows an application example of the present invention. The present invention is applied to a relay system 1 in an end system 2Y which contains a plurality of logical systems 2Y1, 2Y2, . . . , and 2Yn, connects the logical systems with one another using a high quality communications medium such as an internal bus, and communicates with a remote end system 2X according to the internal relay system 1.

As a result, the end system 2Y has high-speed transfer functions brought by the simplified relay processing of the relay system 1 and can provide the reliability of the TCP layer to the network (LAN). Besides, the simplification of the connection management table 4 of the relay system 1 cuts down memory usage, which in turn makes it possible to reduce the amount of memory mounted in the end system 2Y, resulting in reduced costs.

Even if the relay system 1 is installed in front of the logical systems 2Y1, 2Y2, . . . , and 2Yn in the end system 2Y, this will not involve significant performance degradation and thus will not get in the way of producing added value such as controlling the logical systems 2Y1, 2Y2, . . . , and 2Yn by the relay system 1.

Figure 7:
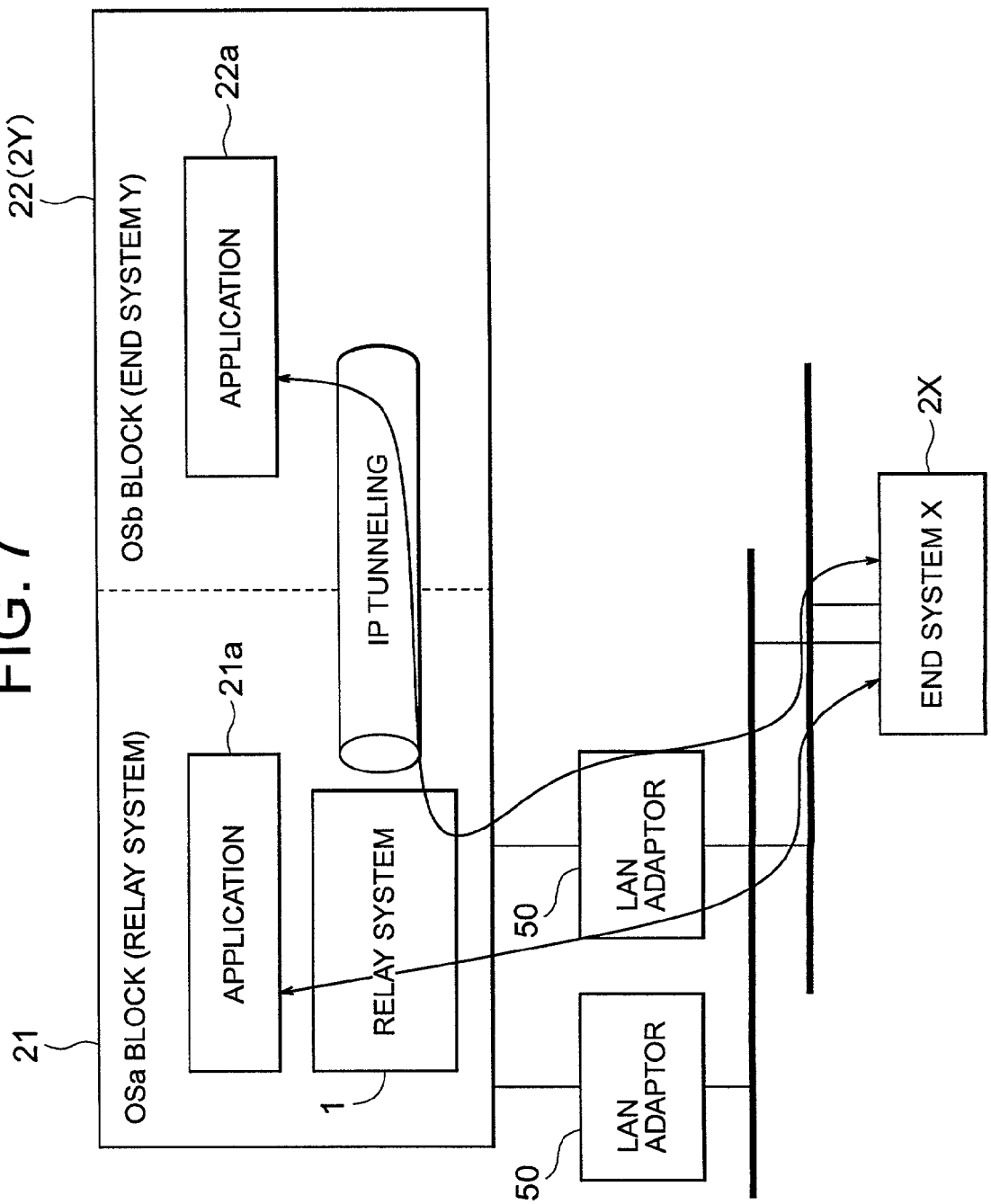
FIG. 7 is a diagram showing a configuration example of the application example shown in FIG. 6.

FIG. 7 shows a configuration example of the application example shown in FIG. 6. Suppose the end system 2Y which is a communications control system is divided, for example, into two blocks with a different operating system (OS) running in each of them. In this example, the end system 2Y is divided into an OSa block 21 where an operating system a (OSa) runs and an OSb block 22 where an operating system b (OSb) runs.

The OSa block 21 corresponds to the logical system 2Y1 shown in FIG. 6 and comprises the relay system 1 and an application (Appl) 21a equipped with high reliability communications control functions. The high reliability communications control functions include, for example, dual-LAN, hot standby, and load sharing (session distribution) functions.

The OSb block 22 corresponds to the logical system 2Y1 shown in FIG. 6 and comprises an application 22a which provides different communications control functions. The OSa block 21 and OSb block 22 of the end system 2Y are interconnected according to a high reliability internal bus. Since each of them has its IP address, they can communicate as if according to a network.

The end system 2X can communicate with the application 21a by a conventional method such as high reliability communications functions using virtual IP address. Also, the end system 2X is capable of carrying out high reliability communications with the application 22a in the OSb block 22 using virtual IP address and traveling from a LAN adaptor 50 in the OSb block 22 to the OSa block 21 by way of the IP Layer (IP tunneling). Thus, the relay system 1 in the end system 2X makes lower layer (network host layer) functions with respect to networks or other systems to be controlled by functions equivalent to the functions of the OSa block 21. This means that the OSa block 21 can perform proxy processing as if the OSb block 22 were provided with high reliability functions.

FIGS. 8 and FIG. 9 show configuration examples of connection management tables 4 retained by the relay system 1 when using a configuration such as the one shown in FIG. 7.

Figure 8A:
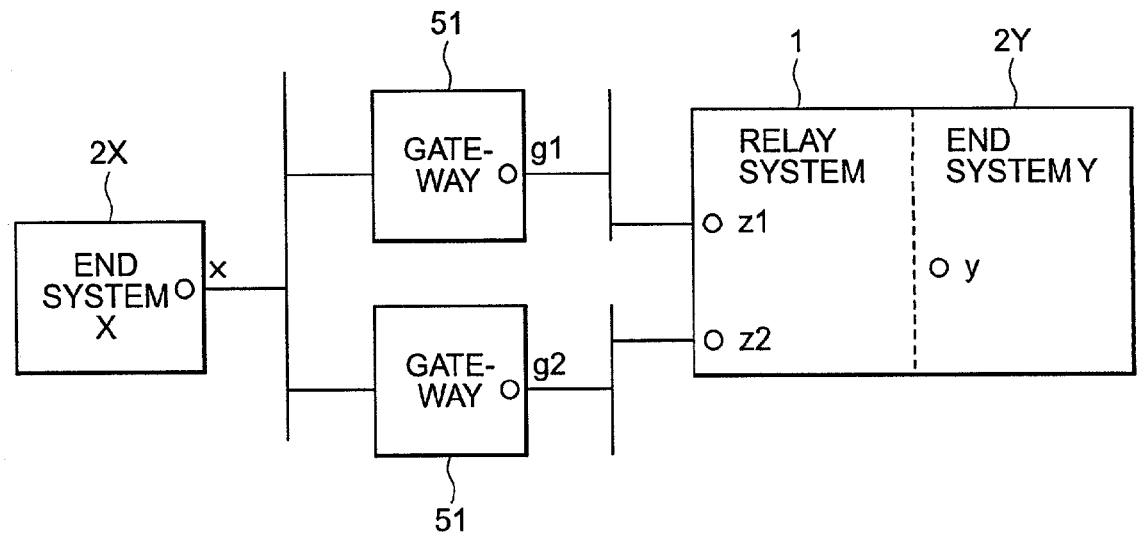
FIG. 8A is a diagram showing an example of IP address when a relay system allows path selection.

As shown in FIG. 8A, suppose that the virtual IP addresses (indicated by white circles in the figure) of the end system 2X, end system 2Y, relay system 1, and gateways 51 are x, y, z1 and z2, and g1 and g2, respectively.

Figure 8B:
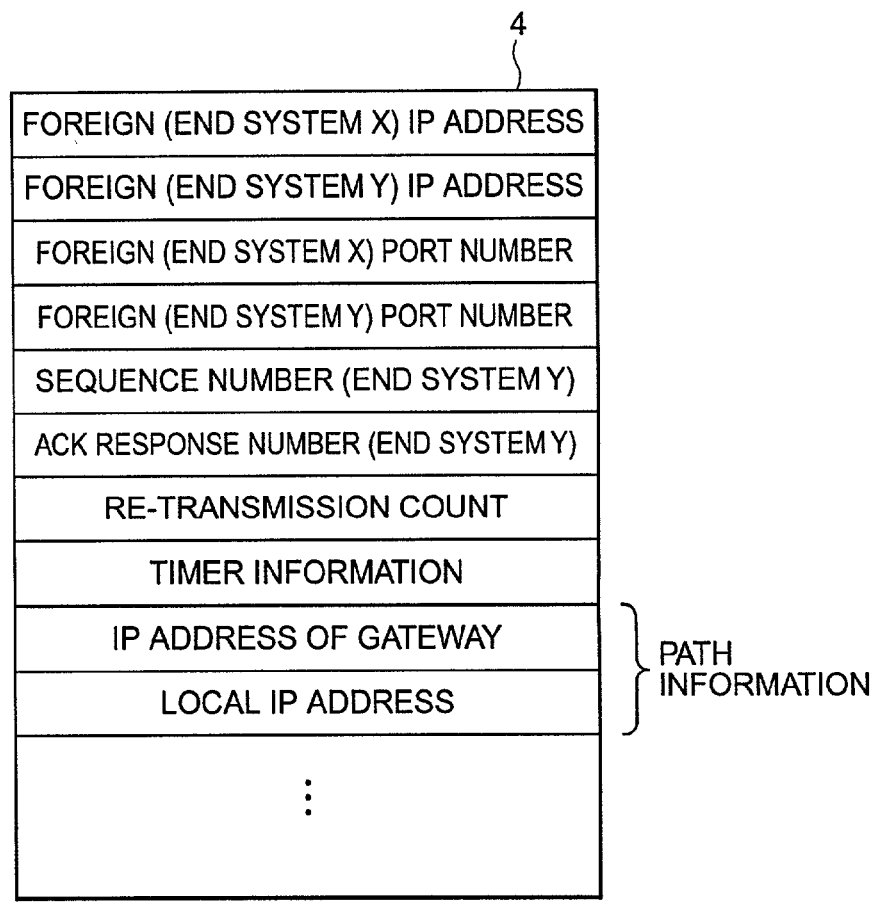
FIG. 8B is a diagram showing an example of a connection management table when a relay system allows path selection.

As shown in FIG. 8B, the relay system 1 sets an IP address (g1/g2) of a gateway and its own IP address (z1/z2) in the connection management table 4 as path information.

Figure 9A:
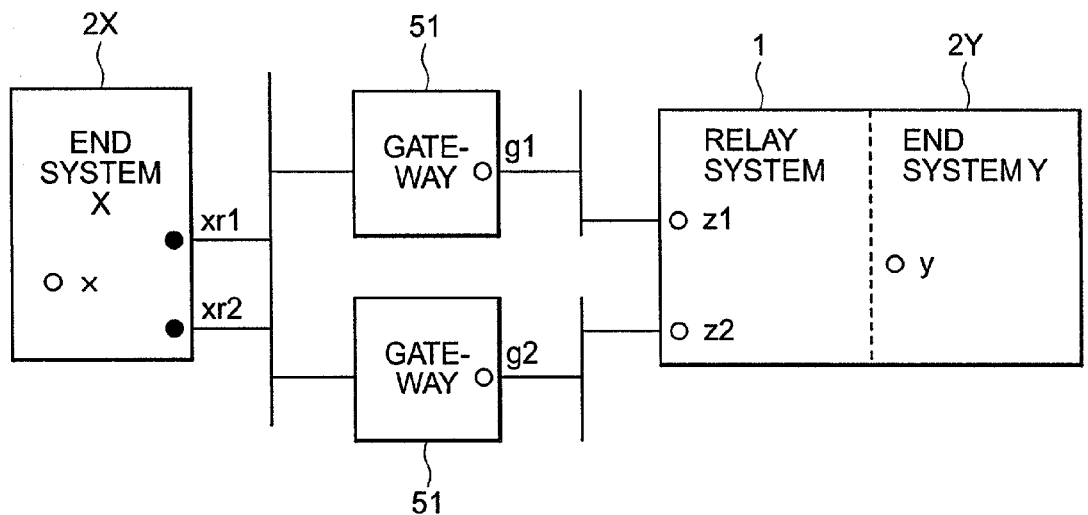
FIG. 9A is a diagram showing an example of IP address when a relay system allows path selection.

As shown in FIG. 9A, suppose also that the virtual IP addresses (indicated by white circles in the figure) of the end system 2X, end system 2Y, relay system 1, and gateways 51 are x, y, z1 and z2, and g1 and g2, respectively, and that the real IP addresses (indicated by black circles in the figure) of the end system 2X are xr1 and xr2.

Figure 9B:
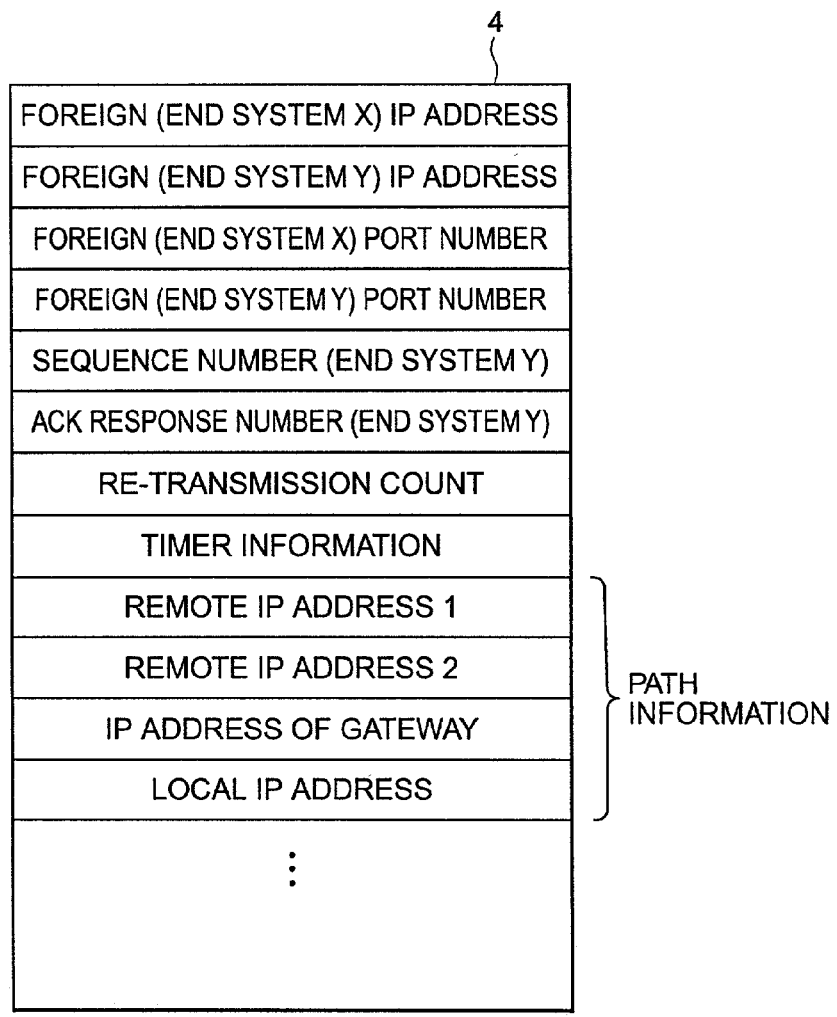
FIG. 9B is a diagram showing an example of a connection management table when a relay system allows path selection.

As shown in FIG. 9B, the relay system 1 sets the IP address and real IP address of one of end systems (end system 2X), an IP address of a gateway, and its own IP address in the connection management table 4 as path information.

If the relay connection management module 106 determines that a fault has occurred in the transmission path or communications traffic is distributed unevenly among paths, the path management module 109 can re-transmit data easily along another path by simply changing the current path information settings of the connection management table 4.

Also, the path management module 109 changes an existing path and updates the path information in the connection management table 4 by external command. This makes it possible to distribute the loads produced by new packets among paths at the connection level.

Figure 10:
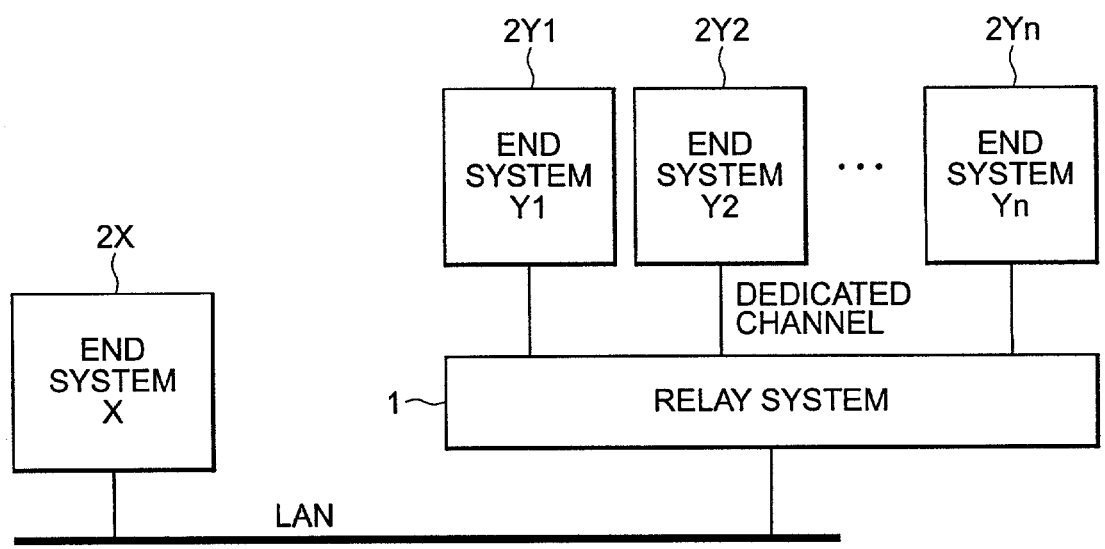
FIG. 10 is a diagram showing another application example of the present invention.
Figure 11A:
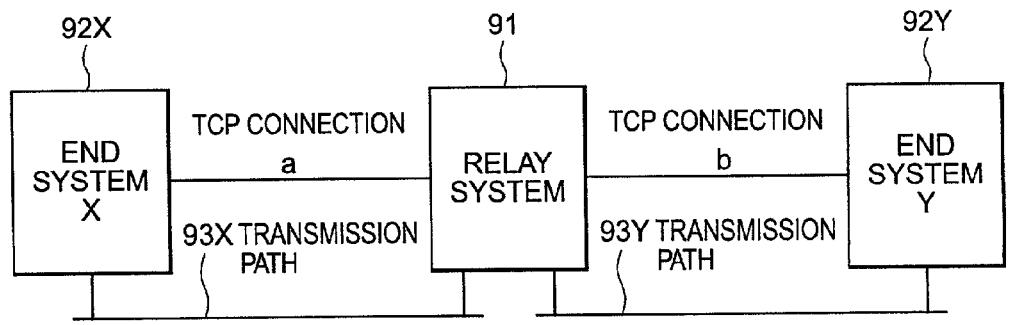
FIG. 11A is a diagram showing an example of a relay system.
Figure 11B:
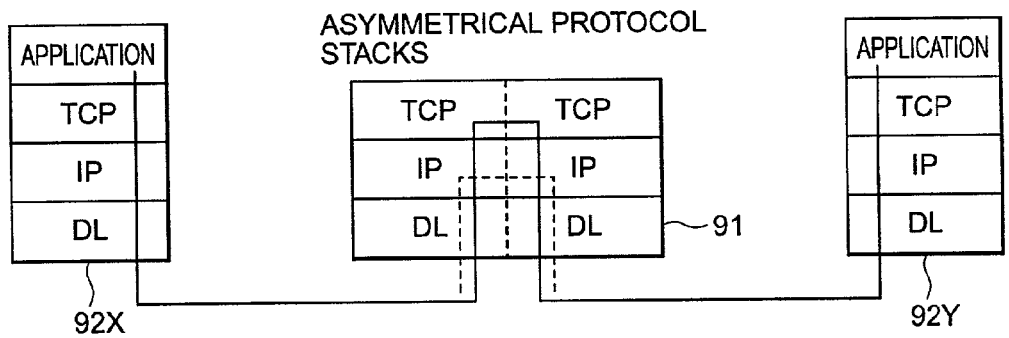
FIG. 11B is a diagram showing protocol stacks example of the connection relay shown in FIG. 11A.
Figure 11C:
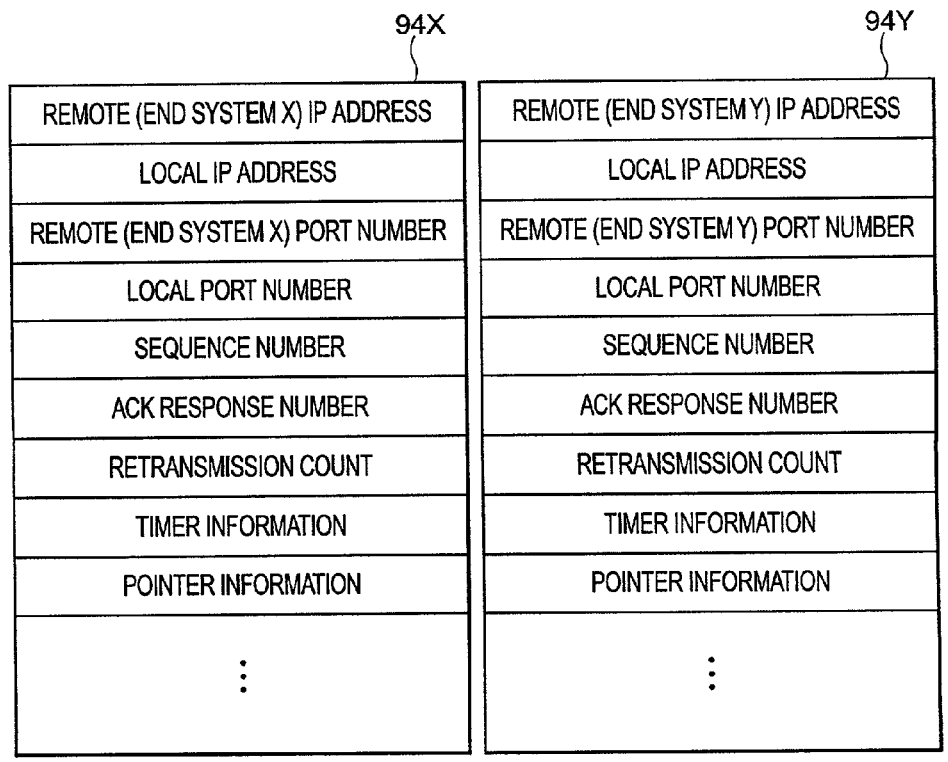
FIG. 11C is a diagram showing an example of connection management information tables equipped in the relay system shown in FIG. 11A.

FIG. 10 shows an application example of the present invention. In a system which is characterized by scalability, i.e., capability to make additions as operation expands, and in which the end system 2Y constitutes a physically separate system, the present invention is applied to a front-end relay system 1 connected with logical systems 2Y1, 2Y2, . . . , and 2Yn by means of dedicated channels. The dedicated channels may be implemented as fiber-optic channels or high quality electric channels, employing SCSI, USB, or other interfaces. Such an application example can reduce the costs of the overall relay system and achieve high-speed transfer.

The present invention has been described above with reference to an embodiment, but it goes without saying that there may be various modifications within the spirit and scope of the present invention. The relay system 1 according to the present invention just has to carry out relay connection management at the transport layer in the OSI Layering Model. It can use any protocol besides the TCP as long as the protocol allows receipt acknowledgement.

As described above, the present invention can simplify relay connection management processes in a relay system and achieve high-speed data transfer.

Also, since the relay system needs to retain less connection management information than conventional systems, it has reduced memory requirements, and thus can slash installation costs and the like.

The present invention allows the relay system itself to act as a TCP termination with respect the partner (end system X), performing control operations such as switching the communications path. On the other hand, since the end system Y and relay system implement the TCP layer in conjunction, processing is divided between the end system Y and relay system, eliminating the overheads which would otherwise be required to process re-transmitted packets and the like in the end system Y.

The programs according to the present invention can be stored in an appropriate recording medium such as a computer-readable, portable memory, semiconductor memory, or hard disk. They are supplied in such recording media or by transmission and reception according to various networks with communications interfaces.

What is claimed is:

1. A relay connection management program for causing a computer to perform relay connections for relaying communications between one end node and another end node according to a protocol which allows receipt acknowledgement at a transport layer, wherein said program causes said computer to execute:
    a process of accessing connection management information which includes destination information of said one end node and said other end node, sequence information and response information for transmission from said one end node to said other end node, and re-transmission count information and updating said connection management information by incrementing said re-transmission count by 1 in case that a re-transmission is received from said one end node and then the sequence number of said re-transmission matches management information in said connection management information; and
    a process of relaying the re-transmissions received from said one end node to said other end node until said re-transmission count in said connection management information reaches a preset number.

2. A relay connection management program according to claim 1, wherein said process of accessing comprises:
    a process of accessing the connection management information including path information; and
    a process of updating said path information on an external cue.

3. A relay connection management program according to claim 1, wherein the program causes the computer to execute:
    a process of monitoring each connection for a designated state using a timer; and
    a process of deleting appropriate connection management information, in said process of accessing connection management information, based on timeout notification received from said process of monitoring.

4. A relay connection management program according to claim 1, wherein said process of accessing comprises a process of reusing connection management information of a released connection as connection management information of a new connection associated with a connection request, in case that it contains destination information which matches the destination information of said connection request, by updating the information contained in said connection management information except said destination information.

5. A relay connection management method for relaying communications between one end node and another end node according to a protocol which allows receipt acknowledgement at a transport layer, said method comprising:
   a step of accessing connection management information which includes destination information of said one end node and said other end node, sequence information and response information for transmission from said one end node to said other end node, and re-transmission count information and updating said connection management information by incrementing said re-transmission count by 1 in case that a re-transmission is received from said one end node and then the sequence number of said re-transmission matches management information in said connection management information; and
   a step of relaying the re-transmissions received from said one end node to said other end node until said re-transmission count in said connection management information reaches a preset number.

6. A relay connection management method according to claim 5, wherein said step of accessing comprises:
   a step of accessing the connection management information including path information; and
   a step of updating said path information on an external cue.

7. A relay connection management method according to claim 5, wherein the method comprises:
   a step of monitoring each connection for a designated state using a timer; and
   a step of deleting appropriate connection management information, in said step of accessing connection management information, based on timeout notification received from said step of monitoring.

8. A relay connection management method according to claim 5, wherein said step of accessing comprises a step of reusing connection management information of a released connection as connection management information of a new connection associated with a connection request, in case that it contains destination information which matches the destination information of said connection request, by updating the information contained in said connection management information except said destination information.

9. A relay connection management apparatus for relaying communications between one end node and another end node according to a protocol which allows receipt acknowledgement at a transport layer, said apparatus comprising:
   a means for accessing connection management information which includes destination information of said one end node and said other end node, sequence information and response information for transmission from said one end node to said other end node, and re-transmission count information and updating said connection management information by incrementing said re-transmission count by 1 in case that a re-transmission is received from said one end node and then the sequence number of said re-transmission matches management information in said connection management information; and
   a means for relaying the re-transmissions received from said one end node to said other end node until said re-transmission count in said connection management information reaches a preset number.

10. A relay connection management apparatus according to claim 9, wherein said apparatus comprises:
    a means for accessing the connection management information including path information; and
    a means for updating said path information on an external cue.

11. A relay connection management apparatus according to claim 9, wherein said apparatus comprises:
    a means for monitoring each connection for a designated state using a timer; and
    a means for deleting appropriate connection management information, in said means for accessing connection management information, based on timeout notification received from said means for monitoring.

12. A relay connection management apparatus according to claim 9, wherein said means for accessing connection management information comprises a means for reusing connection management information of a released connection as connection management information of a new connection associated with a connection request, in case that it contains destination information which matches the destination information of said connection request, by updating the information contained in said connection management information except said destination information.

13. A recording medium which stores a relay connection management program for causing a computer to perform relay connections for relaying communications between one end node and another end node according to a protocol which allows receipt acknowledgement at a transport layer, wherein said program causes said computer to execute:
    a process of accessing connection management information which includes destination information of said one end node and said other end node, sequence information and response information for transmission from said one end node to said other end node, and re-transmission count information and updating said connection management information by incrementing said re-transmission count by 1 in case that a re-transmission is received from said one end node and then the sequence number of said re-transmission matches management information in said connection management information; and
    a process of relaying the re-transmissions received from said one end node to said other end node until said re-transmission count in said connection management information reaches a preset number.

14. A recording medium according to claim 13, wherein said process of accessing comprises:
    a process of accessing the connection management information including path information; and
    a process of updating said path information on an external cue.

15. A recording medium according to claim 13, wherein the program causes the computer to execute:
    a process of monitoring each connection for a designated state using a timer; and
    a process of deleting appropriate connection management information, in said process of accessing connection management information, based on timeout notification received from said process of monitoring.

16. A recording medium according to claim 13, wherein said process of accessing comprises a process of reusing connection management information of a released connection as connection management information of a new connection associated with a connection request, in case that it contains destination information which matches the destination information of said connection request, by updating the information contained in said connection management information except said destination information.

* * * * *